United States Patent

[11] 3,550,637

| [72] | Inventor | Charles Richard Briden<br>Middlesex, N.J. |
|---|---|---|
| [21] | Appl. No. | 735,868 |
| [22] | Filed | June 10, 1968 |
| [45] | Patented | Dec. 29, 1970 |
| [73] | Assignee | Pfaff and Kendall<br>Newark, N.J.<br>a corporation of New Jersey |

[54] HANDHOLE ACCESS ASSEMBLY
5 Claims, 6 Drawing Figs.

| [52] | U.S. Cl. | 138/92, 220/25 |
|---|---|---|
| [51] | Int. Cl. | F16l 55/10 |
| [50] | Field of Search | 138/92; 220/25 |

[56] References Cited
UNITED STATES PATENTS

| 624,715 | 5/1899 | Wenz | 138/92 |
|---|---|---|---|
| 1,162,502 | 11/1915 | Miller | 138/92 |
| 1,456,601 | 5/1923 | Johnson, Jr. | 138/92 |
| 3,364,952 | 1/1968 | Scaglione et al. | 138/92 |

FOREIGN PATENTS

| 1,283,526 | 12/1961 | France | 138/92 |
|---|---|---|---|

*Primary Examiner*—James Kee Chi
*Attorney*—Sommers & Sommers

ABSTRACT: A handhole access assembly for enabling access into a tubular shaft, the assembly having structural features such as to strengthen the shaft section from which material has been removed to create an opening for the handhole cover, and adapted to facilitate access into the tubular shaft.

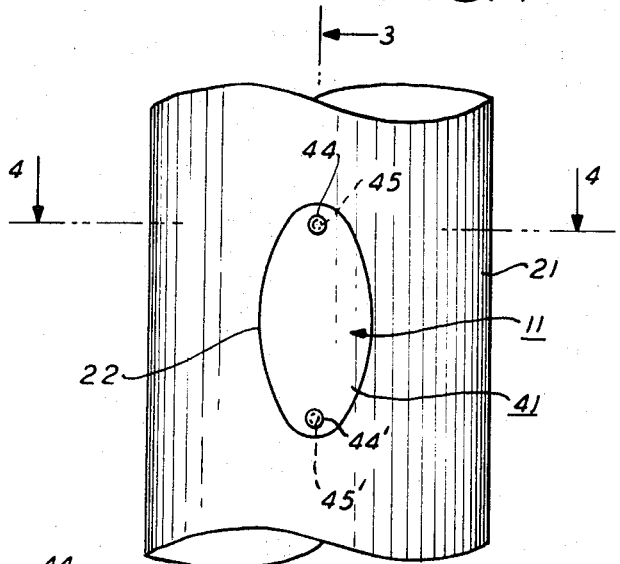
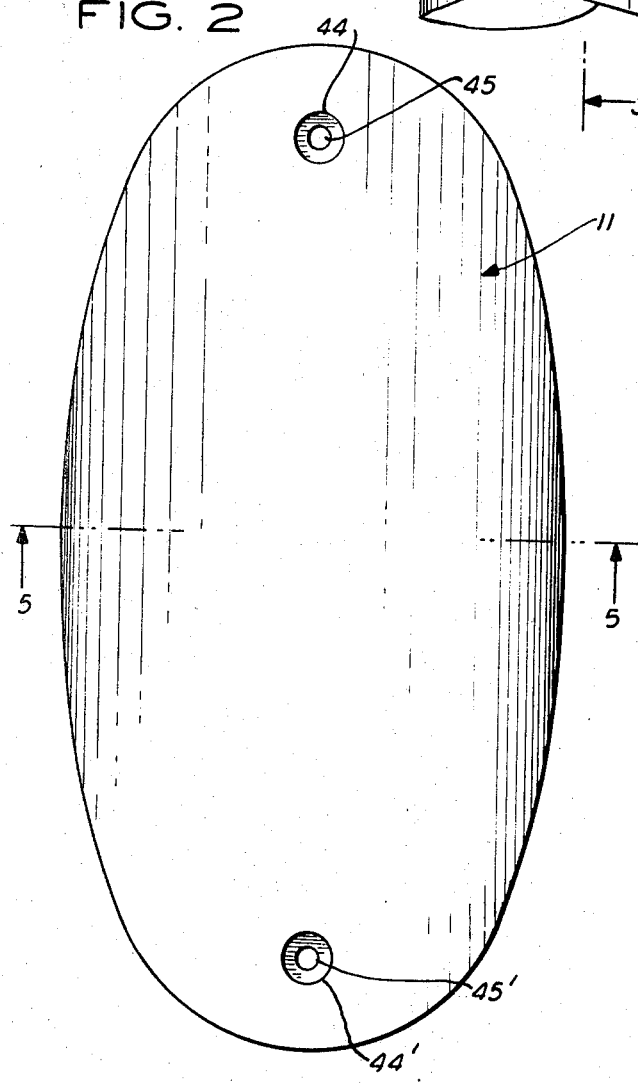
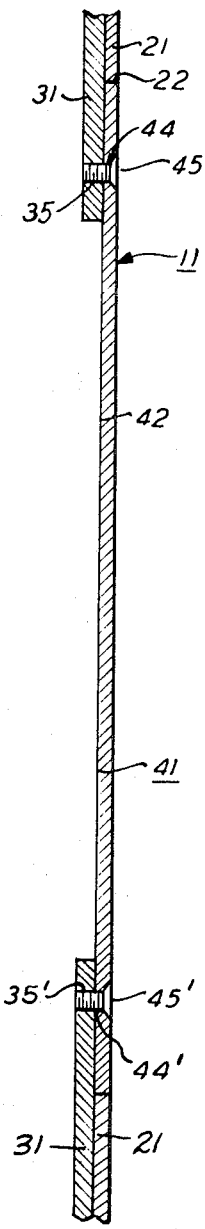

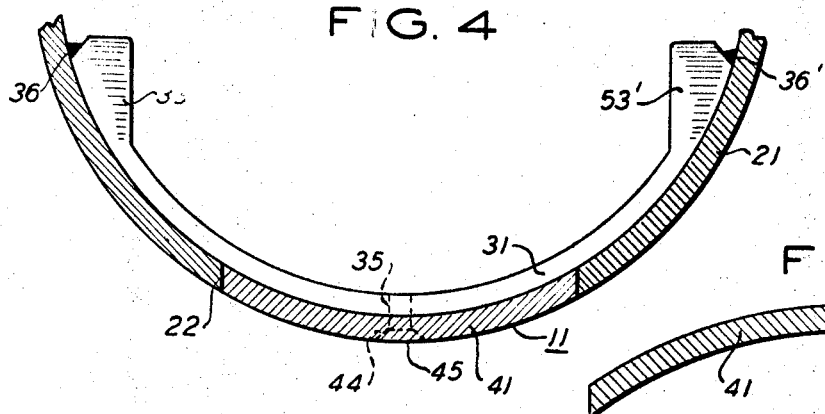
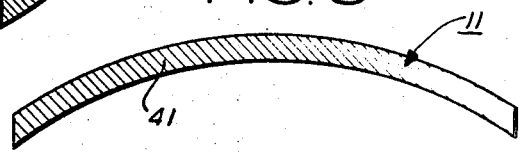
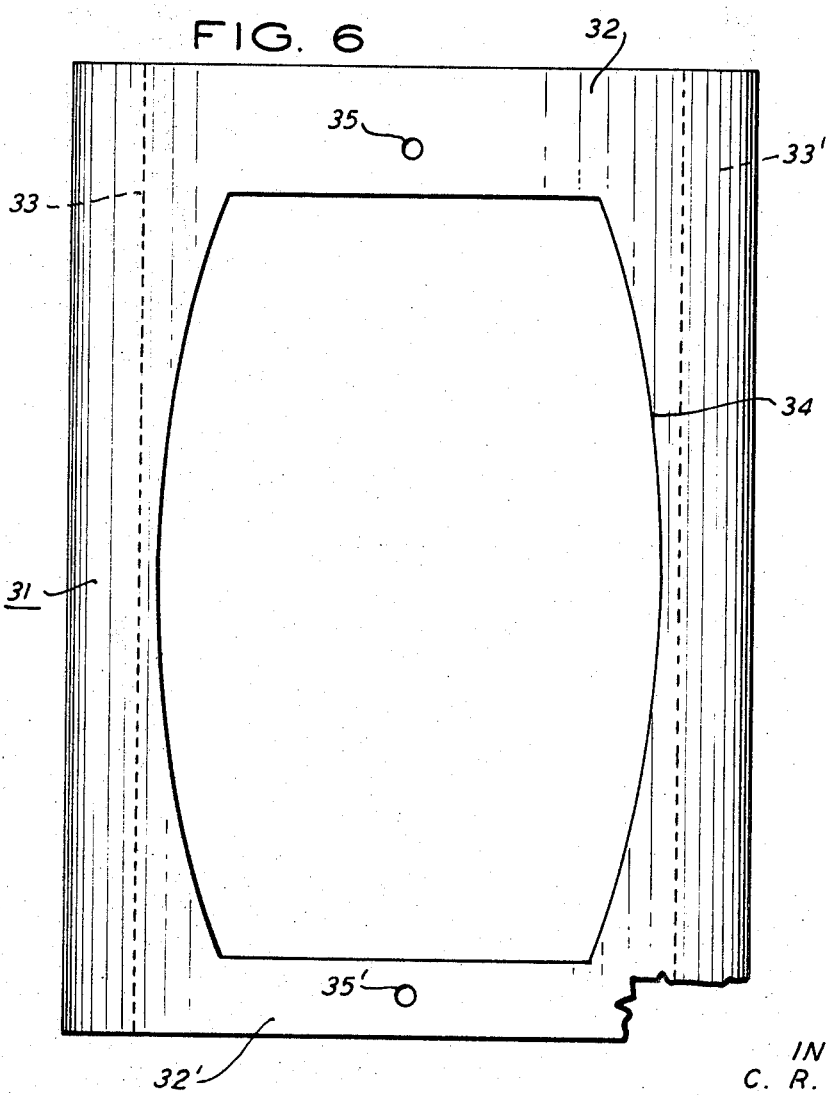

HANDHOLE ACCESS ASSEMBLY

HANDHOLE ACCESS ASSEMBLY

This invention relates to a handhole access assembly for enabling access into a tubular shaft, and more particularly to a handhole access assembly adapted to be conveniently used, and having structural features to afford support for, the tubular shaft, at the point where an opening for the cover has been created.

Pursuant to the invention, the handhole access assembly may be conveniently made and utilized with a structural reinforcing frame member to afford support for a tubular shaft at the area or point of greatest weakness, in particular the point where the aperture and cover therefor are located.

Devices proposed for this purpose heretofore generally have been objectionable due to their complexity, high cost of manufacture and requirement for substantial maintenance. Heretofore, the handhole frame was an aluminum casting welded into the shaft by welding the frame all around on the outside thereof. If flush with the pole, the excess weld was ground off; this sometimes weakened the installation. If the frame was the projecting type, the pole could not be rotary polished at this point. These objections in devices heretofore proposed have been eliminated in the handhole access assembly of this invention, which is furthermore rugged, strong, durable and efficient in use.

In the drawings, wherein similar reference characters indicate like parts:

FIG. 1 is a vertical, elevational, fragmentary, view of a handhole access assembly embodying the invention;

FIG. 2 is a vertical elevational view of a handhole cover embodying the invention;

FIG. 3 is a vertical sectional view, taken on line 3-3 of FIG. 1;

FIG. 4 is a horizontal sectional view, taken on line 4-4 of FIG. 1;

FIG. 5 is a horizontal sectional view, taken on line 5-5 of FIG. 2; and

FIG. 6 is a vertical, partly broken, view of a reenforcing frame member embodying the invention.

As will be seen from the drawings, forming part hereof, as will be described below, this invention relates to a hand hole access assembly such that access is provided into the tubular shaft, and at the same time structural reenforcement and stability of the shaft in the area of the access opening is provided by a reenforcing frame with which the cover interlocks.

Pursuant to the invention, a handhole access assembly 11 (FIGS. 1—4) is provided in the tubular shaft 21 having an opening 22 therein; the reenforcing frame 31 (FIG. 6) is welded along the sides (36, 36' FIG. 4) to the inside surface of the shaft 21.

The reenforcing frame 31 (FIGS. 4 and 6) has top and bottom portions or segments 32 and 32', extruded side supports 33 and 33', cutout access portion 34 and bolt apertures 35 and 35' therein.

The handhole cover 41 (FIGS. 2—4) comprises a face portion 42, apertures 44 and 44', and connection means 45 and 45' (which extend through the apertures 44 and 44' in the cover 41, and the apertures 35 and 35' in the reenforcing frame 31, interlocking the parts together).

In construction of the unit, the handhole access assembly 11 (FIGS. 1 and 3) is formed by cutting an opening 22 (preferably oval in shape) in the tubular shaft 21 and forming cover 41 of complementary shape. The oval contours of the opening 22 and cover 41 prevent stress from forming and eliminate stress concentration due to abrupt changes of cross section in the tubular shaft 21 and stresses and strains flowing therefrom.

The reenforcing frame member 31 (FIGS. 4 and 6) is formed of arcuate rectangular form with the cutout access portion 34 therein. The metal removed in forming the cutout portion 34 is replaced at each end of the reenforcing frame to define side supports 33 and 33' so that the resulting cross section material value through the cutout opening 22 will be equal to that of the cross-sectional material value of the same line taken without the opening. Welding is done on the inside of the shaft only, at 36, 36' (FIG. 4) vertically along the extruded side supports 33 and 33' of frame 31. Thus each cross section of the shaft at the handhole opening area will have only two small areas of weld; a neater, cleaner and much stronger weld is thus provided. The apertures 35 and 35' in the reenforcing frame 31, and the apertures 44 and 44' in the cover 41, are formed to provide openings through which the connection means 45 and 45' extend to interlock the cover and the reenforcing frame. Due to the arcuate conforming shape of the cover 41, the outer surface of the tubular shaft 21 remains smooth and unbroken, eliminating metal fatigue which might otherwise ensue under repetitive bending loads. Annealing of the outside tubular shaft surface is minimized due to the minimum amount of welding.

Since the handhole cover 41 fits flush with the outer surface of the tubular shaft 21 (FIGS. 1) the shaft may be rotary polished with the cover in place, to provide a uniform matching finished door and shaft. The oval shape of the access door and its flush mounting, combined with the matching finish of shaft and door are esthetically superior to existing handholes. Further the entire assembly can be made of wrought material which is stronger than a cast frame; a stronger weld with the shaft results.

The handhole access assembly of my invention may be made conveniently, simply and inexpensively and will be durable and long lasting in use, will provide a firm support for the load carried on the tubular shaft, and will prevent breakage or cracking of the tubular shaft while maintaining the esthetic appearance thereof.

While the foregoing disclosure of exemplary embodiments is made in accordance with the Patent Statutes, it is to be understood that the invention is not to be limited thereto or thereby, the inventive scope is defined in the appended claims.

I claim:

1. A handhole access assembly for facilitating access into a tubular shaft provided with a shaft aperture therein comprising:
   a. a reenforcing frame member, positioned on the interior portion of said tubular shaft and extending adjacent and about said shaft aperture, having a cutout access portion therein generally conforming to the shape of said shaft aperture with nonconforming segments over a portion of said cutout, and frame segments thereof which generally conform to the interior curvature of said tubular shaft, to which they are adjacently affixed and having frame affixation apertures therein, means affixing said reenforcing frame member to the interior of said tubular shaft;
   b. a cover member, complementary in shape to said shaft aperture which fits flush with said tubular shaft outside and inside surfaces when in place in said shaft aperture, having cover affixation apertures therein which are positioned to align with said frame affixation apertures when said cover member is in place in said shaft aperture; and
   c. affixation means, for affixing said cover member to said reenforcing frame member, which are removable to enable access to the interior of said tubular shaft.

2. In a handhole access assembly as described in claim 1, said reenforcing frame member further comprising top and bottom frame segments and side support members.

3. In a handhole access assembly as described in claim 2, said side support members having extruded side portions along the vertical edges thereof, being formed by replacing the material removed to define the shaft aperture.

4. In a handhole access assembly as described in claim 3, said shaft aperture and cover member being oval in shape.

5. In a handhole access assembly as described in claim 4, said reenforcing frame member being affixed to the interior of said tubular shaft by being welded along the vertical edges of said side support members thereof.